Figure 12:
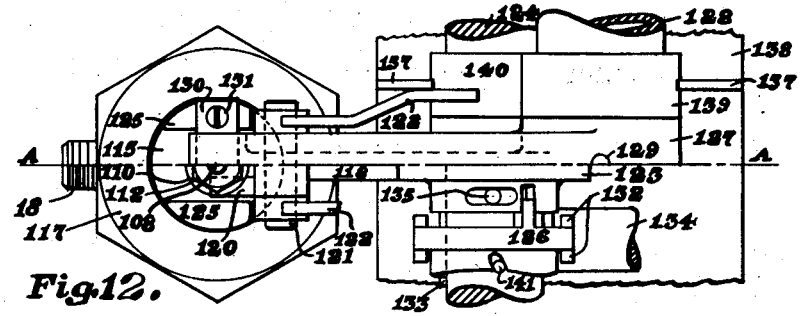

July 16, 1940.  E. A. RICHARDSON  2,207,944
FLUID ACTUATED VALVE
Filed March 3, 1936  3 Sheets-Sheet 1
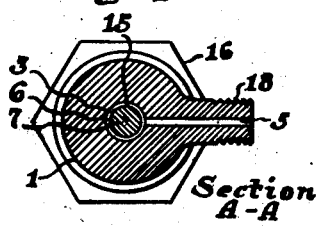
Fig. 4
Section A-A
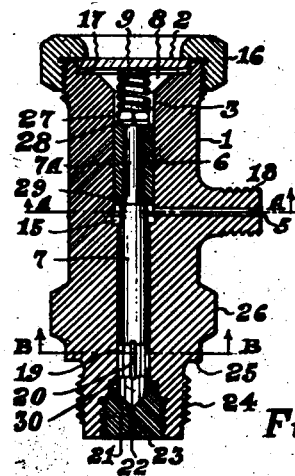
Fig. 1
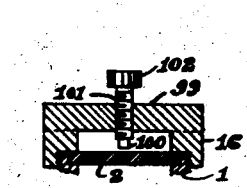
Fig. 5
Section B-B
Fig. 9.
Witnesses:
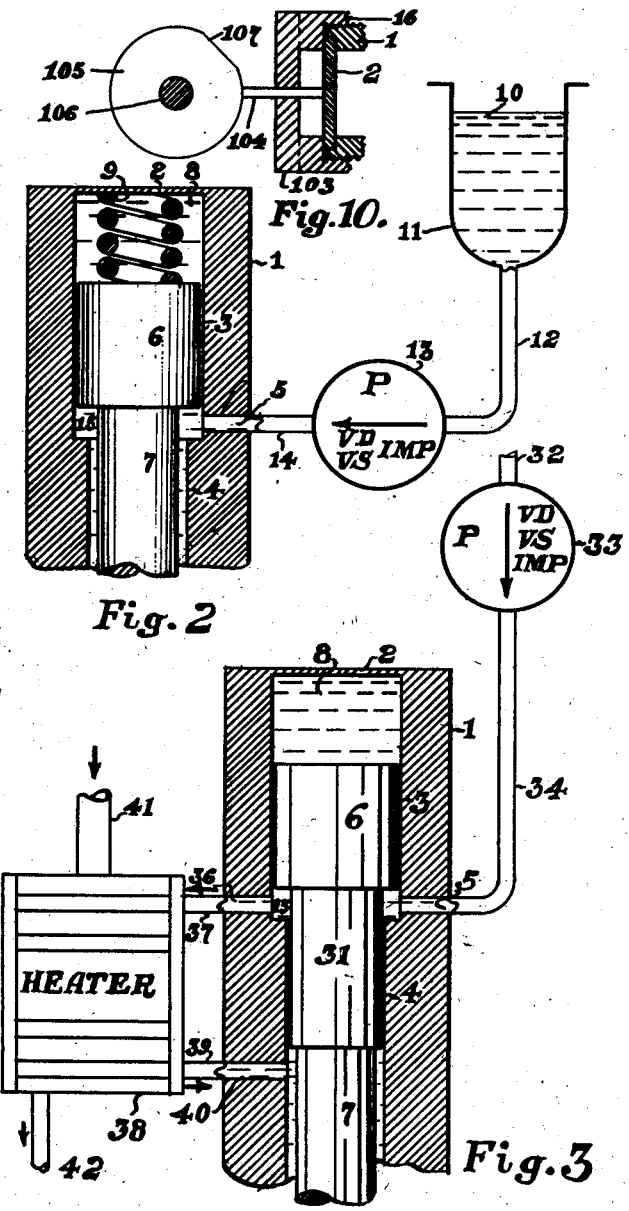
Fig. 10.
Fig. 2
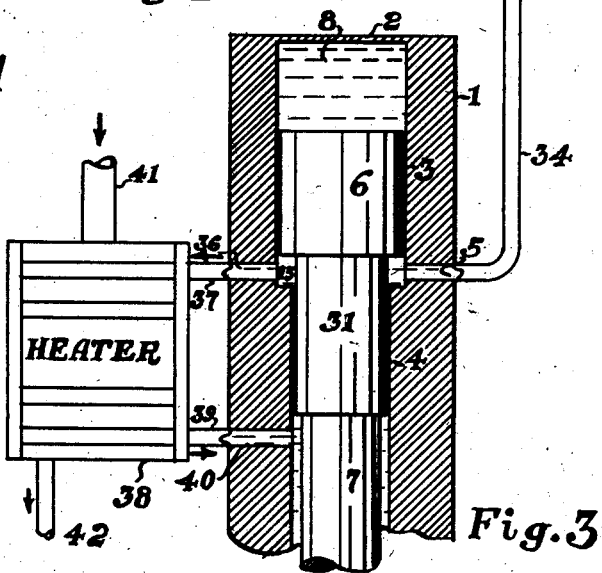
Fig. 3
INVENTOR
Edward Adams Richardson

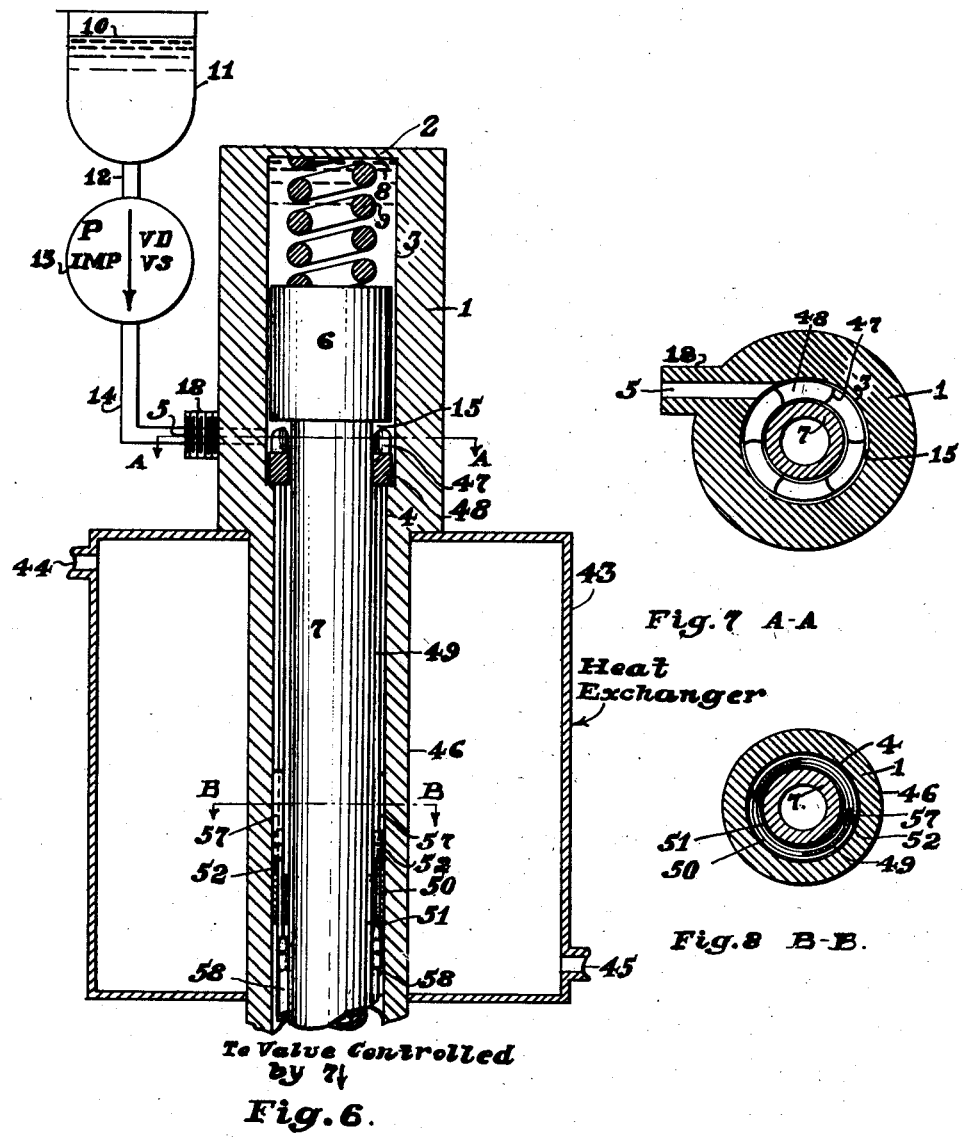

July 16, 1940.  E. A. RICHARDSON  2,207,944
FLUID ACTUATED VALVE
Filed March 3, 1936   3 Sheets-Sheet 3

Edward Adams Richardson
INVENTOR.

Patented July 16, 1940

2,207,944

UNITED STATES PATENT OFFICE 2,207,944

FLUID ACTUATED VALVE

Edward Adams Richardson, Bethlehem, Pa.

Application March 3, 1936, Serial No. 66,853

16 Claims. (Cl. 137—153)

My invention comprises valves and valve-like devices of great variety intermittently operated, through impulses, by expansible-chamber motors characterized by a flexible portion of wall for at least one of the two piston-separated chambers, which flexible wall and the adjacent fluid and other apparatus serve as a spring system.

The motor permits of valves opening towards, or from the motor; of valves operated by impulsive delivery of fluid being controlled, or by impulse applied to the flexible wall, or by control of the movements of the flexible wall; and is distinguished by freedom from moving or actuating parts, passing through walls, requiring packing against fluid pressure and leakage.

Though applicable to valves and valve-like devices of great variety, such, for example, as escapements, ratchet wheels, switches, valves admitting chemicals intermittently in equal or in controlled quantities, blow-delivering devices producing force and motion, and many others, my invention is particularly adapted to fuel-injection valves for internal combustion engines of the injection type such as Diesel engines, and for furnaces. These specifications will describe my invention primarily with respect to such devices, and modifications and adaptations thereof. But it is to be understood that the various means and apparatus may be applied to other valve-like devices in ways which are obvious.

A common type of fuel-injection valve of the automatic type possesses a spring loaded valve stem passing out of the valve body through an accurate lapped fit, is operated by the impulse of the metered quantity of fuel acting on a differential piston, and the valve lift is frequently controlled externally by a valve-stem stop.

One form of my fuel valve is similar to the above in many respects, but differs in that the stem is cut off inside of the valve body, the lapped stem or piston fit is replaced by a clearance allowance adapted to rapid manufacture, the chamber above the piston is enlarged, this chamber is sealed by a flexible diaphragm and gasket, a light spring between diaphragm and gasket loads the valve-stem, all interior spaces are fluid-filled by the fluid being controlled, and the valve-lift is controlled by limiting the deflection of the diaphragm, while external spring, spring retainers, and leakage drains are dispensed with. This type of valve is shown in Figs. 1, 4, 5 and 10 to be described later.

My invention possesses numerous advantages, a few of which will be noted briefly, to wit:

A. Packed moving parts and fluid leakage avoided;

B. High-speed spring system permits high operating frequencies;

C. Extreme simplicity;

D. Comfortable manufacturing allowances on all dimensions;

E. Low cost from C and D, perhaps $1.50 where equivalent costs $15;

F. Valve lift limited without mechanical parts entering body;

G. Moving and stationary parts free to expand relative to each other, as thermally;

H. Thermal expansion, of G, does not upset setting of F;

I. Fluid being controlled may be heated on passage even as high as to 900 to 1000 degrees F. as in applying my Process for preparing fuels, U. S. Patent Number 1,876,168, issued September 6, 1932;

J. Adaptable to the application of highly effective and efficient heating means;

K. Adaptable to inwards, or outwards opening valves;

L. Adaptable to constant quanta, or variable quanta delivery;

M. Adaptable to a common-rail, constant-pressure fluid supply, or to an impulsively delivered, metered fluid supply;

N. Adaptable to accurate fluid quanta metering by control of impulse on flexible diaphragm, including also phase timing of injection;

O. Simple and low cost means, as of N, avoid high cost multi-cylinder metering fuel pumps and substitute therefor a common-rail system with geared, or the equivalent, pump supplying fluid in excess, pressure relief valve, accumulator or the equivalent, and metering fuel valves, all simple, all adapted to mass production tolerances on dimensions, and of low cost;

P. Net result, a high-speed, precise, simple fuel system adapted to the application of my methods of I, (above), and producible in quantities at low cost.

Q. Equivalent advantages for a wide variety of valves and valve-like devices.

I attain these objects and others by the means illustrated in the accompanying drawings, in which—

Figure 11:
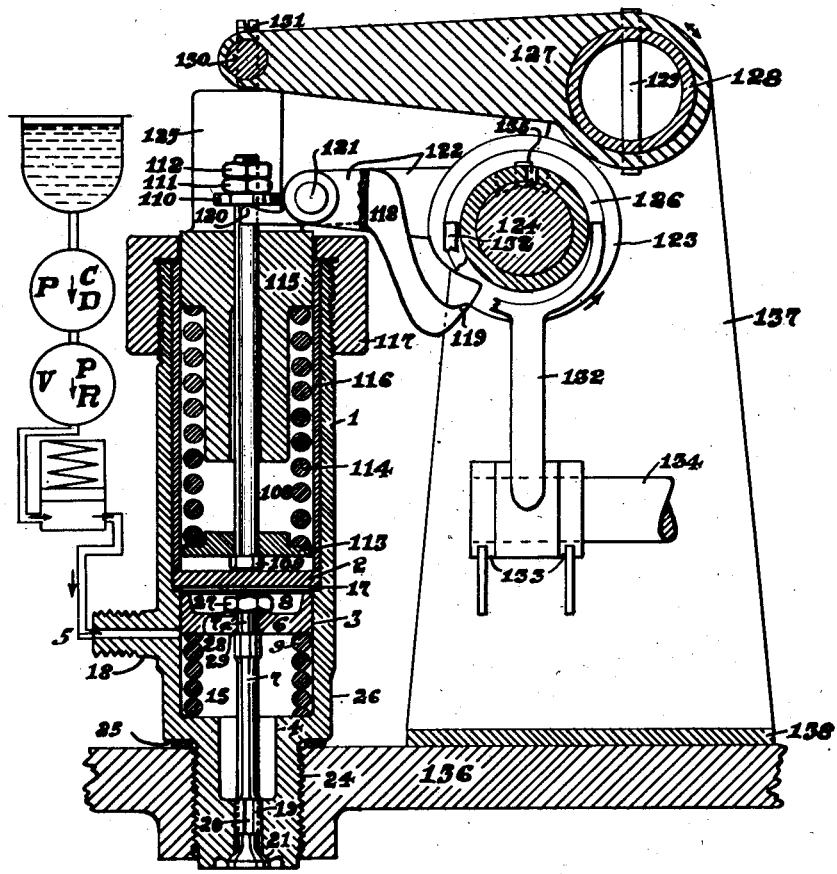

Fig. 1 is a normally vertical section of a simple injection valve embodying my invention; Fig. 2 is a normally vertical section, diagrammatic, illustrating that portion of the valve embodying my invention; Fig. 3, also diagrammatic and in normally vertical cross-section, illustrates a modification of my invention permitting of the heating or other treatment of the actuating fluid between the steps of actuation and control; Fig. 4 is a horizontal section of Fig. 1 on A—A; Fig. 5 is a horizontal section of Fig. 1 on B—B; Figure 6 shows diagrammatically, in normally vertical cross-section, a valve of the type of Figure 2 with an extended portion of body 1 adapted to heat exchange, and provided with a form of surface cleaning device such as may be required in heating decomposable, or gumming, fluids. Figure 7 is a cross-section of Figure 6 on plane A—A showing means for motorizing the cleaning device through the fluid impulses. Figure 8 is a cross-section of Figure 6 on plane B—B suggesting the arrangement of the scrapers used in surface cleaning; Fig. 9 is a partial section of Fig. 1 illustrating one form of means for limiting valve lift; Fig. 10 is a similar section of Fig. 1, rotated 90°, illustrating a method for control of the valve opening by mechanical means; Fig. 11 shows an elevation, partly in section on A—A of Fig. 12, of an outward opening valve with fluid supply means adapted to feed fuel to injection engines according to my invention, together with controlled impulse means for regulating the fluid quanta discharged, the frequency of discharge, and the phase of injection. Fig. 12 shows the apparatus of Fig. 11 in plan with part of mechanism below A—A broken away for clarity.

Similar numerals refer to similar parts throughout the several views.

In Fig. 1, 1 is the valve body, 2 a flexible diaphragm closing one end, 3 the wall of the cylinder in which piston 6 slides, 4 the wall of the cylinder spaced from valve stem 7, 5 the passage through which the fluid being controlled enters the valve body at space 15 below piston 6, 6 the actuating piston through which extension 7A of valve stem 7 passes, 8 is the fluid space between 1, 2, and 6, 9 is a spring exerting a closing force on the valve through 6 and 7, 15 is the space below 6 in communication (past stem 7 and through channels 20 in 19, a stem-guiding enlargement of 7) with the valve at seat 21, 16 is the retaining nut, screwing on 1, pressing 2 against a suitable packing 17, 18 is the threaded connection for the fluid supply line, 21 is the valve seat in end plug 23 which latter is screwed into 1 and has fluid outlet passage 22, leakage being prevented by suitable packing 30, 24 is the threaded end of 1 for screwing the valve into the combuston chamber wall, 25 is the packing seat of 1 for sealing the combuston chamber, 26 is the nut formed on 1 for screwing 1 into the combustion chamber or for holding 1 against turning while nut 16 is being screwed down, 27 is a piston retaining nut threaded on 7A and secured by lock washer 28, while 29 is a packing sealing the space between 6 and 7A.

In Fig. 2, 1 is the valve body, 2 a flexible wall thereof, 3 the wall of the expansible chamber pertaining to my invention, 4 the wall of the stem space which is in communication with the valve chamber, 5 the inlet for the fluid being controlled as it actuates the valve by its surges, 6 a piston with a close sliding fit in 3 and attached to valve stem 7, 8 the space above 6, fluid filled, formed by 1, 2 and 6, 9 a spring for maintaining the valve on its seat prior to actuation and during periods of "quiet," a fluid 10 passes from tank 11 through pipe 12 to a pump 13 which is capable of delivering said fluid impulsively to the valve, at such times and in such amounts as desired, through pipe 14 and opening 5 to space 15 which is below piston 6 and in communication with the passage between 7 and 4.

Fig. 3 illustrates at 1 the valve body, flexible wall thereof 2, 3 the wall of the expansible chamber pertaining to my invention, 4 the wall of the expansible chamber communicating with the valve, 5 the fluid inlet passage leading to space 15 below piston 6, 8 the fluid space formed by 1, 2 and 6, 31 is an enlargement of stem 7 forming a close sliding fit in 4, 32 a fluid feed line from a suitable supply and feeding a pump 33 similar to 13 of Fig. 2. 33 delivers to opening 5 through pipe 34; 15 delivers fluid through opening 36 and pipe 37 to fluid heater 38 and the heated fluid is returned through pipe 39 and opening 40 to the space between 4 and 7. The heater shown is supplied with heated fluid through 41 which delivers its heat to the fluid being heated and is then exhausted through pipe 42. Spring 9 is omitted as the weight of 6, 31, 7 and other attached parts may replace the spring force.

In Fig. 4, valve body 1 is sectioned at A—A of Figure 1 so that valve spindle 7 and valve body 1 are shown in section at the level of the center of fluid inlet passage 5. Piston 6 is seen above as a small annulus while space 15 is bounded in part, as shown, by wall 3, spindle 7 and piston 6. The retaining nut 16 for flexible diaphragm 2 is visible.

In Fig. 5, valve body 1 is sliced at B—B. The enlargement 19 of stem 7 is sectioned, showing its sliding fit in bore 4, and also a plurality of fluid passages 20 in 19. Looking up, the threaded fluid inlet connection 18, body nut 26, and flexible diaphragm 2 retaining nut 16 are visible.

In Fig. 9 I show that the motion of diaphragm 2 may be limited as in the manner shown. 1 is the valve body, and 2 the flexible diaphragm as in Fig. 1, 16 is the retaining nut for 2 modified by the addition of a cross bar 99 adapted to hold a suitable adjustable limit screw 101 provided with a point 100 and a head 102.

In Fig. 10 I show that the motion of diaphragm 2 may be allowed to occur only as cam 105 attached to and rotating with shaft 106 brings contour 107 into position so that tappet 104, pressed between 2 and 105, and guided by cross bar 103 on nut 16, is allowed to move. In this case, the actuating fluid medium may be maintained at a substantially constant high pressure instead of being delivered impulsively. Or, if the cam forces the tappet to the right instead of permitting it to move left, as shown, a valve may be actuated positively by the cam irrespective of the fluid pressure, provided the design of the valve permits of such operation.

Figure 6 shows a convenient arrangement of the valve of Figure 2, adapted to either heat or cool the fluid being controlled. The valve differs from that in Figure 2 by being adapted in diameter and length of the outside 46 along part of the body to heat transfer cooperation with the heating means. Surface 46 of body 1 is enclosed by a structure 43 adapted to direct the flow of heat transfer fluid thereover. The heat-exchange (heating or cooling) fluid may be admitted through 44 into 43, and the used fluid removed through the outlet 45. Connection 18 is shown offset so that the impulsively moved fluid entering space 15 through passage 5 may set up rotary motion therein, driving the vanes 47 attached to rotor 48, which in turn carries the plurality of scraper drivers 49. These are spaced and stiffened at one or more positions along the length by outer banding rings 50, and inner banding rings 51 sufficiently rigidly attached thereto. Between these rings are secured scraper-blade holding-pieces 52 to which are attached, alternately with respect to the circumference of 7, blades 57 scraping surface 4 and blades 58 scraping the surface of 7.

Fig. 7 shows the section of Figure 6 along A—A so as to suggest a possible means for operating the scrapers. Valve-body 1 is provided with a connection 18 containing inlet-passage 5 leading to annular space 15, which is bounded on the outer side by wall 3 of 1, and on the inside by valve-stem 7, while a freely rotating body 48 is provided with vanes 47 which pass before the outlet of passage 5. The valve-stem is shown hollow, though this is not essential.

Figure 8 shows the section of Figure 6 along B—B through the body within the heat-exchange zone. Valve-body 1 is shown with a simple cylindrical outer surface 46, and a similar inner surface 4 concentric therewith, while 7 is the valve-spindle concentric with the body. A plurality of scraper drivers 49 are arranged in the space between 4 and 7. Outer banding ring 50 and inner banding ring 51 are sufficiently rigidly attached to drivers 49. Scraper-blade holding pieces 52 are fastened rigidly between 51 and 50 at a plurality of points along the rings. To these are fastened in any suitable manner, as by riveting or welding, scraper blades 57 scraping surface 4, or blades 58 scraping 7, only blades 57 showing clearly.

In Fig. 11, the outward opening valve according to my invention is substantially diaphragm 2 and therebelow, except as noted, while the metering impulse-delivering device is substantially situated above diaphragm, together with the actuating device comprising cam 123 and lever 118, the phase controlling device represented by helically slotted sleeve 126 and shifting lever 132, and the impulse regulating or throttling device represented by spring retainer 115, lever 127, and shaft 128.

More particularly, fluid is supplied to space 15 through passage 5 in connection 18 of body 1 from a reservoir of fluid supplying a pump P—CD which is preferably of the constant displacement type and capable of exerting adequate pressure in supplying fluid in excess (and in proportion to engine speed when geared to an engine), which pump delivers to pressure-relief valve V—PR which wastes the excess flow and regulates the delivery pressure as required, from which valve the fluid may flow through an accumulator or other storage device on its way to 5. Valve body has wrench grip 26 facilitating assembly and screwing into combustion-chamber wall 136 at 24 while compressing a gasket between faced end 25 and wall 136. Piston return spring 9 is placed in 15, valve stem 7 with guide portion 19 slotted at 20 is inserted to seat valve at 21 while gasket 29, piston 6, and gasket 28 are assembled on continuation 7a of stem 7 and fastened with nut 27. Space 8 is fluid filled and gasket 17 and diaphragm 2 inserted, the latter being locked by disc retainer 116 compressed by nut 117 screwing on body 1. Hammer stem 108 and hammer head 109 thereof are inserted in spring retainer 113, spring 114 placed thereon, spring retainer 115 placed in position as shown and inserted in 116. Lever 118 is pivoted in brackets 122 by pin 121 and washer 110 is placed over 108 on the claws 120 of 118 and locked to 108 while adjusting clearance between 109 and 2 by means of nut 111 and lock-nut 112. Bracket 122 is carried on pedestal 137 which is fastened to base 138 and supports bearings 139 and 140 and bracket 133. Shaft 124 rotating at cam-shaft speed is passed through bearing 140, cam 123, phase cam 126 and the like for other valves in the case of a multi-cylinder engine, cam 123 is retained from axial motion by pin 135 but is free to oscillate about the shaft axis as permitted by the pin slot, the tongue of phase cam 126 is inserted in the slot corresponding in 123 and pin 141 is secured to 124 so that axial motion of 126 causes rotation of 126 about the shaft axis as the helical slot passes over the pin, and the tongue of 126 rotates cam 123, axial motion being given 126 through forked lever 132 which is fastened to control shaft 134 pivoted in bearings 133. Cam-follower 119 of lever 118 rests on the contour of cam 123. Shaft 128 is passed through bearings 139 and levers 127 and fastened to the latter by pins 129, this shaft being rotatable through a small angle by any suitable means. Pin 130 is inserted in 127 and adjusting screws 131 are brought into contact with projections 125 of 115, both 130 and 131 being then locked in position. Rotation of 130 varies the lever arm of 127 so as to adjust for small variations in spring stiffness between valves while moving 131 out or in assists in this adjustment and also assists in caring for small differences in free height of springs 114.

In Fig. 12 it is well to note that 127 is split on A—A as are also the parts comprised in the body of valve 1, while shafts and cams are broken as indicated. Thus we may better see the arrangement of 118 and related parts which are situated under 127.

Referring to Fig. 2, the method of operation is as follows:

All spaces between the outlet valve of pump 13, including pipe 14, passage 5, space 15, space 8, the clearance space between 3 and 6, the clearance space between 4 and 7, down to the valve and its seat, are filled with the fluid being controlled. When out of operation, or more precisely while the valve is closed, spring 9 exerts a force between wall 2, which may be flexible, and piston 6 which is transmitted through stem 7 to the valve, holding the latter on its seat. This arrangement presumes that the valve opens by an upwards movement of the valve-stem. During this quiescent period, the fluid pressure in all spaces tends to become the same, an excess of pressure, if any, being found in space 8 which tends to dissipate through fluid flow from 8 past 6 into 15 as the compressed fluid in 8 expands and that in 15 is compressed by the transfer. I have neglected pressure differences due to differences in hydraulic head, as they will be small for fuel injection valves, though not necessarily for others. Due allowance can be made for such pressure differences. Spring 9 need exert but a very small force as the main work of closing the valve falls upon the fluid compressed in 8 and the recovery of the flexed diaphragm 2. If the weight of the valve, stem, and piston is sufficiently large, the force due to the weight may be sufficient without spring 9. It is not essential that spring 9 act against flexible wall 2, as any wall of space 8 may be made flexible disc 2.

Suppose now a small quantity of fluid is impulsively forced by pump 13 through tube 14 and opening 5 into space 15, thereby slightly compressing the fluid with a material rise in pressure. Two things occur. Some fluid tends to leak through the clearance between 6 and 3 into space 8, while the difference in pressure between 15 and 8 acting on piston 6 tends to accelerate the mass of 6, 7 and the valve. The pressure in 8 rises and the flexible wall 2 deflects. That fluid will seep around the piston is obvious, for the mass being accelerated by the pressure drop between 15 and 8 in the case of the clearance liquid is much less per unit of cross section than in the case of piston 6 so as much fluid will flow as can in view of the friction of the narrow passage. But as the piston motion continues and pressures in 15 and 8 approach equality, the excess inertia of the piston-spindle mass due to its acquired velocity will compress the fluid in 8 causing the pressure therein to tend to exceed that in 15, thereby in part reversing the flow of fluid in the clearance space. The spring force 9 will vary little during the process. This force is effectively an increase in the inertia of the moving parts.

When the pump impulse ceases and passage of fluid through the valve lowers the pressure in 15, the pressure of flexible member 2 on the fluid in 8 will accelerate both the fluid therein and the moving parts. As before, fluid will seep past piston 6 (but from space 8 towards space 15) for the first part of the piston travel, but the spring force is now reducing inertia of the moving parts, so we may expect a slight gain of fluid in space 8 when the valve is seated, which fluid will be slowly discharged by the continued movement of diaphragm 2.

Upon repeating the process before "quiet" conditions are attained, we shall have a still further increase in the fluid in space 8, but with continued repetitions of fluid impulses, the system will tend towards a permanent cycle of operations according to the frequency of the impulses and the quantity of fluid transferred per impulse. Space 8 will tend to have a definite pressure at the instant of pressure impulse reaching space 15 according to quantity and frequency of fluid impulses.

It will be obvious that any expansion of 7 relative to 1 will be cared for by slow fluid displacement between 8 and 15 quite effectively without interfering with impulsive opening.

It should be obvious that my method of valve motorization is peculiarly adapted to very high speeds of operation. The piston virtually has negative friction as it starts to open, owing to the tendency of the fluid to pass it on going from 15 to 8. Although at first glance it might appear that leakage between 15 and 8 through the generous clearances allowed would prevent operation, it appears that fluid friction is sufficient to insure fluid and piston moving substantially together under impulse.

The effect of speed variations remain to be considered. The inertia force varies inversely as the square of the time for a harmonic oscillation. The leakage velocity varies directly with the difference of pressure between 15 and 8 permitted by inertia. The pressure to discharge the fluid from the valve will vary inversely as the square of the time for injection. It appears that at slower speeds the leakage through the clearance will be less troublesome rather than more so. Hence a valve suited to full speed operation should operate effectively on starting or while idling. If leakage should become of some importance, slightly smaller clearance allowances may prove desirable, as the friction loss and velocity for a given pressure drop vary inversely as the square of the clearance allowance.

Referring now to Figure 3, excepting for the removal of the spring 9 and an effective increase in the volume of the space between wall 4 and spindle 7 by the heater volume, and the reduction of compressibility of the fluid by heating, the operation of the valve is the same as for Figure 2. The fluid impulse strikes a mass of fluid in a substantially closed space, forcing piston 6 to move, thereby opening the valve and permitting the pressure to lower as the fluid between 15 and the valve is accelerated and overcomes the friction of the passages. Enlargement 31 of spindle 7 merely serves to limit the leak or short circuit of the fluid between space 15 and the space below 31. A commercially producible sliding fit, utilizing quantity production methods, together with the small difference of pressure between 15 and the space below 31 serve to limit the leakage to a small fraction of the fluid being heated. Any suitable means of heating may be used in place of the device indicated. This arrangement is to be used when for any reason it is preferable to heat the fluid outside of the valve itself. The sliding surfaces are cooled by the entering fluid. Heat short-circuited through 31 is recovered by the fluid.

Other advantages of the valve actuating means now become obvious. Any expansion of the spindle 7 relative to valve body 1 causes a slow flow of fluid between one side of piston 6 and the other without appreciably upsetting operating pressure cycles. The spring member, 2, is kept at constant, or substantially constant temperature. Even when the fluid is being gasified, the cooling effect of the fluid passing through 15 will maintain a liquid seal in part or all of space between 31 and 4. It may be objected that gasification would so increase the elasticity of the fluid beyond space 15 as to make the valve inoperable and lead to leakage of the fuel or fluid through the valve more rapidly than it could be supplied. But it must be remembered that, under any stable conditions of operation, and such stable conditions are rapidly attained after any change, the mass of fluid entering through 5 and the mass leaving through the valve must be equal. As opening impulses dissipate themselves more and more in compressing a more and more elastic mass of fluid, the tendency for the valve to open will be less and less, thereby throttling the flow. A set of pressure conditions, or cycle of operations substantially stable, will exist below the piston 6 as well as above. Low rates of flow will correspond to low mean pressures, high rates to high pressures, modified only by variations in the duration of a pressure impulse with rate of flow.

The lift of the valve may be easily controlled. When dealing with liquids, in general, which are much less compressible or variable in volume than the diaphragm with fluid pressure, restraint of the diaphragm deformation from outside of the valve body, as by the stop shown in Fig. 9 limiting the deflection of the center of the diaphragm which materially increases the diaphragm stiffness with respect to further deformation, is sufficient to limit the opening of the valve. The adjustment may change slightly during the period of setting up stable cycle pressures, but once stable conditions are attained, no expansion or contraction of the spindle and piston relative to the valve body can change the adjustment. Any desired restraint of deflection or deformation of the diaphragm may be imposed. The type of stop shown in Fig. 9, preferably with the addition of locking means, or even with remote control for changing adjustment with conditions, is sufficiently simple and effective.

Utilizing the cyclically variable stop of Figure 10, the flexible diaphragm 2 which is under pressure may be kept from motion during part of the cycle, but permitted to move to the left during the balance thereof as determined by the form given to 107, and then returned to position so that control of the valve opening characteristics may be secured within limits. For some purposes, a constant pressure feed line may be caused to discharge substantially fixed quantities of fluid by such a device, the quantity of discharge being controlled by the feed pressure. Change in cam speed will increase the number of discharges but reduce the amount per discharge. In all of these methods the control is greatly simplified by the avoidance of high pressure packing glands for reciprocating or other parts. The diaphragm edge is almost fixed and easily packed.

Certain types of valves differ from that shown in Fig. 1 in that the valve opens by the descent of the spindle rather than its rise. The change involved consists in placing spring 9 below piston 6 instead of above, in passing spindle 7 through end plug 23 and forming seat 21 in inverted position on the outer face of 23 instead of the inner. So modified, pressure in space 15 cooperates with the spring 9 in closing the valve. If diaphragm 2 is forcibly depressed, as by, for example, such a mechanism as shown in Fig. 10 modified by a raised face at 107 instead of a depression, the valve may be opened according to a substantially set pattern in periodic fashion. Flow through such a valve might be controlled by varying the pressure in space 15.

It will be obvious that there are many ways in which a fluid filled chamber with a flexible wall may be utilized in the control of the operation of a valve device. My invention relates primarily to the use of such a device in conjunction with a piston with limited clearance between itself and the wall of the cylinder in which it reciprocates, so that some fluid motion past the piston between two chambers, as 8 and 15, may occur. Thereby a new and useful result is secured, for changes in the relative dimensions of body 1 and spindle 7 with its appendages are compensated automatically, and wider limits in the tolerances for piston 6 and wall 3 may be utilized, thereby greatly reducing the cost of fabrication of these parts As the invention of the valve shown in Fig. 1 resulted from a search for means of utilizing my Process of preparing fuels for use, U. S. Patent 1,876,168, issued to me September 6, 1932, the valve devised for heating the operating and controlled fluid during passage therethrough forms one particular form of my invention, though not the only possible form thereof for the above purpose. To carry out this process more effectively, valves of the character shown in Figure 6 were devised.

Referring to this figure, cold, or slightly heated fluid 10 from tank 11 passes through pipe 12 to a pump P, of the impulsive delivery type but adapted to varying speed and varying volume of discharge, from which it is delivered impulsively through pipe 14 and passage 5 of the offset connection 18 of body 1 into chamber 15, which latter, with all other communicating spaces of body 1, is fluid filled. As is the case in valves of the type of Figs. 1 and 2, the pressure impulse forces the piston 6 to rise, opening the valve through long valve stem 7. The fluid leaving space 15 through the annular passage between wall 4 and valve-stem 7 is spread out in a very thin stream of considerable surface area well adapted to a heat interchange process between chamber 16 and the valve. It may be noted that relatively large quantities of fluid may be heated to the high temperatures desired, so far as heat interchange between wall 4 and the fluid is concerned. No large temperature drops between 4 and fluid, or inside the fluid between 4 and 7 need occur. Hence the chance of chemical cracking of the fluid due to excessive local heating may be avoided.

By performing the heating operation between space 15 and the valve, the operating parts may be kept cold, heat tending to leak upwards is recovered in the fluid, and the necessity for directly controlling the hot fluid, and all the difficulties in connection therewith, are avoided.

The heat exchange apparatus, shown, merely indicates a closed shell substantially concentric with the portion of the body 1 being heated, and adapted both to the introduction of fluid, and the removal thereof after use.

It is important to note that cooling may be effected rather than heating with the heat exchange arrangement shown.

In view of the limitations upon operation which may arise in the preferred application of preparing fuels according to my United States Patent No. 1,876,168 previously referred to, in which the fluid may pass momentarily through a zone near the valve wherein its temperature enters the "cracking" range, it has seemed necessary to indicate means whereby any deposition of solid carbon may be strictly limited. Hence any suitable scraper structure acting at least in the zone of such excessive heating may be introduced into the space between surface 4 and stem 7. The particular form shown has been previously described.

Metering valve, Figs. 11 and 12, illustrates the operation of outwards opening valves, particularly as adapted to a constant-pressure fluid supply, and the means which may be used to regulate the quantity of fluid discharged. The first question is the maximum pressure of the fuel supply, the minimum time and maximum quantity of fluid discharge, as these quantities determine the valve area, valve lift, and details of seat 21, guide passage for 19, and slots 20. For smooth and regular valve operation, it is desirable to have the pressure in space 15 substantially constant throughout the operating cycle, though it may prove desirable to change the pressure in 15 with engine speed or with load. The piston 6 tends to accelerate and increase the pressure of the fluid in 15 by its downwards motion. The effective volume of 15 should be large relative to the discharge volume so that pressure changes due to fluid expansion may be kept small. In this connection, the size and length of supply passage 5 and the characteristics of the accumulator are important, as they may determine the effective volume of 15. The accumulator may be replaced by a common rail of some flexibility and volume, but the effect should be present. The rest of the fluid supply system consists of a reservoir, a pump of constant displacement operating proportional to engine speed and supplying fluid in excess, and a pressure relief valve adapted to returning the excess fluid to the reservoir while controlling the pressure. Other equivalent means may be used.

Having determined the valve and fuel system, the actuation of the valve requires attention.

The valve and stem 7 are attached to piston 6 which fits cylinder 3 with a comfortable clearance, the valve being held up to its seat by spring 9 which exerts a force in excess of, the pressure in 15 times the area of guide cylinder at 19, which force is unbalanced. Under static conditions, then, pressure in 8 equals that in 15, space 8 being closed by flexible disc, or disc assembly 2, and filled with the fluid in 15. To open the valve, the pressure in 8 is increased sufficiently to overcome spring force 9, and accelerate the piston and attached parts and the fluid mass in 15, and displacing enough volume in 8 to lift the valve the desired amount. Now the pressure in 8 deflects the disc outwards. The volume of space 8 is changed by the pressing of hammer-head 109 upon the center of 2, thereby depressing the disc center. The maximum force of 109 or 2 is limited by the stress range in the disc center. If the pressure rise in space 8 is relatively small, and we have seen in the case of Fig. 1 that such may be expected, the primary requirements are that the maximum load of 109 shall produce a depression volume which will lift the valve the required amount while limiting stresses as above.

Although I have shown piston 6 of the same diameter as the outside of spring 9, it will be found that a smaller piston area will simplify the securing of adequate deflection volume, and strength and required force of 109. The important thing is to lift the valve the proper amount, so that smaller 6 the better. The leakage past piston 6 is small, as we saw in the case of Fig. 1, so with disc 2 held depressed the valve will stay open an appreciable time in spite of such small leakage as occurs, though there is, of course, a limit to this time. The smaller piston will reduce such leakage.

Having settled the piston diameter and volume of space 8 and the disc and spring 114 design, it is next necessary to provide for the application and removal of 109 from the disc. Spring 114 is constrained by 115 at one end and by 113 supported on 109 the head of spindle 108 at the other. 108 is held up by prongs 120 of lever 118 acting on disc 110 fastened to and located on 108 by nuts 111 and 112. Lever 118 is pivoted on 121 and has a cam follower 119 riding on cam 123. The contour of this cam serves to raise 108, compressing spring 114, and release 108 as permitted by the cam coming into the position shown. The time of dwell of 108 on disc 2 will depend on the cam contour and the speed of rotation of shaft 124 which drives the cam. As the fluid discharge is a function of the time of dwell, the discharge will vary with engine speed unless the tension of spring 114 is changed, or the fluid pressure in 15, or the angular dwell permitted by the cam, or a combination of these. The cam could be made in two parts angularly rotatable the one relative to the other, to vary the angular dwell. This has not been shown. We have already suggested varying the pressure in 15. Furthermore, at constant speed it is necessary to vary the discharge with engine load. Varying spring tension is easily accomplished, as is also the pressure in 15, so these two, singly or in combination, are acceptable for handling load and speed variations.

Upper spring retainer 115 has prongs 125 and cam slide axially in 116. Pins 131 in pivot 130 of lever 127 bear on 125. As shaft 128 is angularly moved, carrying 127 therewith, 115 is raised or lowered and the spring tension is lowered or raised. As commercial springs vary in force per inch to compress, the lever arm of 127 may be varied by rotating pin 130 and by screwing pins 131 in or out, so as to secure equal loading for all engine cylinders. Obviously other means than levers may be used, but a lever is simple. Unfortunately a considerable moment is put on 128 making operation difficult. A screw press is a device avoiding this difficulty. 130 and 131 must be properly retained.

To overcome the disadvantage of varying time of dwell with engine speed, we may substitute a measured hammer blow by 109 for the maintained pressure typical of the device shown. As a matter of fact, the part 109 does deliver a portion of its effect as a hammer blow due to the acceleration of 109 before contact with 2, but the portion of the actuating force so arising is small compared with the total force. Besides, a hammer blow is noisy. Nevertheless, by properly choosing springs and hammer fall, we could arrange for said hammer effect. In arranging for a hammer blow, the deflection of 2 by the increased pressure in 8, exceeding allowable stresses at the clamped edge of the disc, must be avoided, as by limiting the upward movement of the disc edge.

As the engine speed is varied, it becomes necessary to vary the crank-shaft angle at which injection occurs. This is most easily managed by changing the angle of the cam relative to its shaft. For this purpose cam 123 is restrained axially on 124 but may rotate through a limited angle thereon, as permitted by pin 135 fixed to 124 and the enclosing slot of 123. The cam is held and driven by a projection of phase cam 126 sliding axially in a slot of the cam collar. Phase cam 126 has a helical slot engaging pin 141 fixed to shaft 124. As 126 is moved axially by the engaging forked end of 132, as that lever, fixed to shaft 134, is rotated thereby, phase cam 126 is rotated slightly about the shaft axis, changing the phase of the cam. Of course the cam itself could have been made long for this purpose. In the case of a multi-cylinder engine, it is preferably to make the cams solid on shaft 124, and arrange that 124 as a whole be driven through a driving stub continuation thereof through such a device as phase cam 126 on the stub and a slotted collar, similar to that of the cam shown, fixed to the shaft. A number of other means will be obvious, such as a spline fitting, sun and planet gearing, a chain drive providing for change in relative length tight and loose sides, and many others.

In the material which has preceded, I have indicated how my flexible wall motors filled with fluid may be impulsively actuated in a variety of ways. Valves may be opened inwardly or outwardly, by fluid impulses impressed on the fluid supply line, or by impulses impressed on the flexible wall while maintaining a constant pressure fluid supply line. The impulse may be regulated so as to produce metering of the fluid injected. The fluid may be heated, if desired, while passing the valve, and that at an extremely rapid rate. I have shown how metering mechanisms may be arranged, how constant pressure on the fluid system may be maintained, and the various factors affecting the design of these valves and their operating motors. My principal invention resides in the combination of the flexible wall of a fluid filled valve motor and a comfortable clearance about the piston thereof whereby fluid friction substantially causes the clearance fluid to move solidly with the piston under impulses, yet permits free fluid flow under small maintained forces such as may be necessary for adjustments.

It will be noted that my invention is particularly adapted to the control of fluids of great variety under high pressures while obviating the leakage and friction of packed glands and the troubles of maintenance. Such adaptations may be readily made in view of the disclosures I have made relative to valves for controlling the injection of fluid fuels to engine cylinders. The adaptability to low cost manufacture will be obvious. The simplification of the fuel system for engines, either with cold fuel injection or under my gasified fluid patents, will be reasonably apparent.

A great many variations may be made in the various apparatus I have shown without departing from the invention I have disclosed; the methods and apparatus I have described illustrate various forms of my invention, and suggest how it may be adapted to other uses.

Having described my invention and the method of operation, and having exhibited certain particular forms thereof of particular utility, including a fuel injection valve adapted to the heating of the fuel passing through, towards the successful operation of which my invention materially contributes, and having indicated modifications in construction and operation which may be made, I substantially complete the disclosure of my invention.

I claim:

1. In a fluid actuated valve, the combination of a casing having a compartment formed therein, a movable pressure-responsive member positioned within said compartment and dividing it into two chambers located on opposite sides of said member, one of said chambers having an inlet and an outlet therefrom, the second of said chambers being in constant communication with said first chamber through a restricted passage and otherwise closed at all times, a valve controlling the outlet from said first chamber, means for creating within one of said chambers an impulsive rise in fluid pressure, whereby the pressure-responsive member moves toward the other chamber, and means for actuating said outlet valve through the movement of said pressure-responsive member.

2. In a fluid actuated valve, the combination of a casing having a compartment formed therein, a movable pressure-responsive member positioned within said compartment and dividing it into two chambers located on opposite sides of said member, one of said chambers having an inlet and an outlet therefrom, the second of said chambers being in constant communication with said first chamber through a restricted passage and otherwise closed at all times, a valve controlling the outlet from said first chamber, means for creating within said first chamber an impulsive rise in fluid pressure, whereby the pressure-responsive member moves toward the other chamber, and means for actuating said outlet valve through the movement of said pressure-responsive member.

3. In a fluid actuated valve, the combination of a casing having a compartment formed therein, a movable pressure-responsive member positioned within said compartment and dividing it into two chambers located on opposite sides of said member, one of said chambers having an inlet and an outlet therefrom, the second of said chambers being in constant communication with said first chamber through a restricted passage and otherwise closed at all times, a valve controlling the outlet from said first chamber, means for creating within said second chamber an impulsive rise in fluid pressure, and means for actuating said outlet valve through the movement of said pressure-responsive member.

4. In a fluid actuated valve, the combination of a casing having a cylinder formed therein, a piston movable within said cylinder and dividing it into two chambers located on opposite sides of said piston, means for creating within one of said chambers an impulsive rise in fluid pressure, the other of said chambers being in constant communication with said first-named chamber through a restricted passage and otherwise closed at all times, and means operated by movement of the piston for dissipating the impulsive pressure rise in said first chamber, whereby in operation the piston is first moved toward and compresses the fluid in said second chamber and is then returned to initial position primarily by the elastic recovery of the fluid in said second chamber.

5. In a fluid actuated valve, the combination of a casing having a cylinder formed therein, a piston movable within said cylinder and dividing it into two chambers located on opposite sides of said piston, one of said chambers having an inlet and an outlet therefrom, the second of said chambers being independently expansible under pressure and in constant communication with said first chamber through a restricted passage and otherwise closed, a valve controlling the outlet from said first chamber, and means for actuating said outlet valve through the motion of said piston.

6. In a fluid actuated valve, the combination of a casing having a cylinder formed therein, a piston movable within said cylinder and dividing it into two chambers located on opposite sides of said piston, one of said chambers having an inlet and an outlet therefrom, the second of said chambers having at least a portion of one wall thereof flexible and being in constant communication with said first chamber through a restricted passage and otherwise closed, a valve controlling the outlet from said first chamber, and means for actuating said outlet valve through the motion of said piston.

7. In a fluid actuated valve, the combination of a casing having a cylinder formed therein, a piston movable within said cylinder and dividing it into two chambers located on opposite sides of said piston, one of said chambers having an inlet and an outlet therefrom, the second of said chambers having at least a portion of one wall thereof flexible and being in constant communication with said first chamber through a restricted passage and otherwise closed, a valve controlling the outlet from said first chamber, means for actuating said outlet valve through the motion of said piston, and means tending to hold said valve in seated position to close said outlet and to return it to said position when displaced therefrom.

8. In a fluid actuated valve, the combination of a casing having a cylinder formed therein, a piston movable within said cylinder and dividing it into two chamber located on opposite sides of said piston, one of said chambers having an inlet and an outlet therefrom, the second of said chambers having at least a portion of one wall thereof flexible and being in constant communication with said first chamber through a restricted passage and otherwise closed, a valve controlling the outlet from said first chamber, means for actuating said outlet valve through the motion of said piston, and means limiting the extent of the outward motion of said flexible wall portion.

9. In a fluid actuated valve, the combination of a casing having a cylinder formed therein, a piston movable within said cylinder and dividing it into two chambers located on opposite sides of said piston, one of said chambers having an inlet and an outlet therefrom, the second of said chambers having at least a portion of one wall thereof flexible and being in constant communication with said first chamber through a restricted passage and otherwise closed, a valve controlling the outlet from said first chamber, means for actuating said outlet valve through the motion of said piston, and means adapted to limit periodically the extent of the outward motion of said flexible wall portion.

10. In a fluid actuated valve, the combination of a casing having a cylinder formed therein, a piston movable within said cylinder and dividing it into two chambers located on opposite sides of said piston, means for creating within one of said chambers an impulsive rise in fluid pressure, the other of said chambers having at least a portion of one wall thereof flexible and being in constant communication with said first-named chamber through a restricted passage and otherwise closed, and means operated by movement of the piston for dissipating the impulsive pressure rise in said first chamber, whereby in operation the piston is first moved toward and compresses the fluid in said second chamber and is then returned to initial position primarily by the elastic recovery of the fluid in said second chamber.

11. In a fluid actuated valve, the combination of a casing having a cylinder formed therein, a piston fitting said cylinder with a small clearance and dividing it into two chambers located on opposite sides of said piston, said chambers being in constant communication through said clearance, one of said chambers being otherwise closed at all times and the other chamber having an inlet and an outlet therefrom, a valve controlling said outlet, and means for actuating said outlet valve through the motion of the piston.

12. In a fluid actuated valve, the combination of a casing having a cylinder formed therein, a piston fitting said cylinder with a small clearance and dividing it into two chambers located on opposite sides of said piston, said chambers being in constant communication through said clearance, one of said chambers being otherwise closed at all times and having at least a portion of one wall thereof flexible, the other chamber having an inlet and an outlet therefrom, a valve controlling said outlet, and means for actuating said outlet valve through the motion of the piston.

13. In a fluid actuated valve, the combination of a casing having a cylinder formed therein, a piston movable within said cylinder and dividing it into two chambers located on opposite sides of said piston, one of said chambers having an inlet and an outlet therefrom, the second of said chambers having at least a portion of one wall thereof flexible and being in constant communication with said first chamber through a restricted passage and otherwise closed, a valve controlling the outlet from said first chamber, means for actuating said outlet valve through the motion of said piston, and means for periodically flexing said flexible wall to compress the fluid in said second chamber.

14. In a fluid actuated valve, the combination of a casing having a cylinder formed therein, a piston movable within said cylinder and dividing it into two chambers located on opposite sides of said piston, one of said chambers having an inlet and an outlet therefrom, the second of said chambers having at least a portion of one wall thereof flexible and being in constant communication with said first chamber through a restricted passage and otherwise closed, a valve controlling the outlet from said first chamber, means for actuating said outlet valve through the motion of said piston, and means for intermittently and impulsively moving said flexible wall portion inwardly.

15. In a fluid actuated valve for controlling the discharge of a heated fluid, the combination of a casing having a cylinder formed therein, a piston movable within said cylinder and dividing it into two chambers located on opposite sides of said piston, one of said chambers having an inlet thereto, the second of said chambers having at least a portion of one wall thereof flexible and being in constant communication with said first chamber through a restricted passage and otherwise closed, a passage connecting said first chamber and an outlet port, means for heating fluid passing through said passage, a valve controlling said outlet port, and means for actuating the outlet valve through motion of said piston.

16. A fluid-discharging valve intermittently and impulsively operated, comprising the parts, a body containing a cylindrical valve-chamber and a cylinder concentric therewith and a continuation thereof and a chamber opening into the end of the cylinder remote from the valve-chamber, a closing means for the body at the valve-chamber end thereof provided with a valve seat and fluid discharge passage therepast, a spindle concentric with the valve-chamber and cylinder adapted to guided axial motion therein while permitting fluid flow from the cylinder to the valve-seat and adapted to serve as a valve at the valve-seat end and adapted to a piston at the cylinder end, a piston in said cylinder fitting therein with a small clearance and fastened to the spindle in such manner as to maintain a space between itself and the valve-chamber end, a flexible diaphragm fastened to the body and sealing the chamber and cylinder on the side of the piston away from the valve-chamber, means tending to maintain the valve in the closed position and tending to return it thereto when displaced therefrom, means for introducing fluid between the piston and the valve-seat, and means for attaching the body to the apparatus into which the valve discharges.

EDWARD ADAMS RICHARDSON.